Aug. 2, 1949.  C. ARNE  2,477,564
STABILIZING APPARATUS FOR LIFTER ROOF TANKS
Filed July 31, 1946  2 Sheets-Sheet 1

Inventor:
Christian Arne,
By Chritton, Schroeder, Merriam & Hofgren,
Attys.

Aug. 2, 1949.  C. ARNE  2,477,564
STABILIZING APPARATUS FOR LIFTER ROOF TANKS
Filed July 31, 1946  2 Sheets-Sheet 2
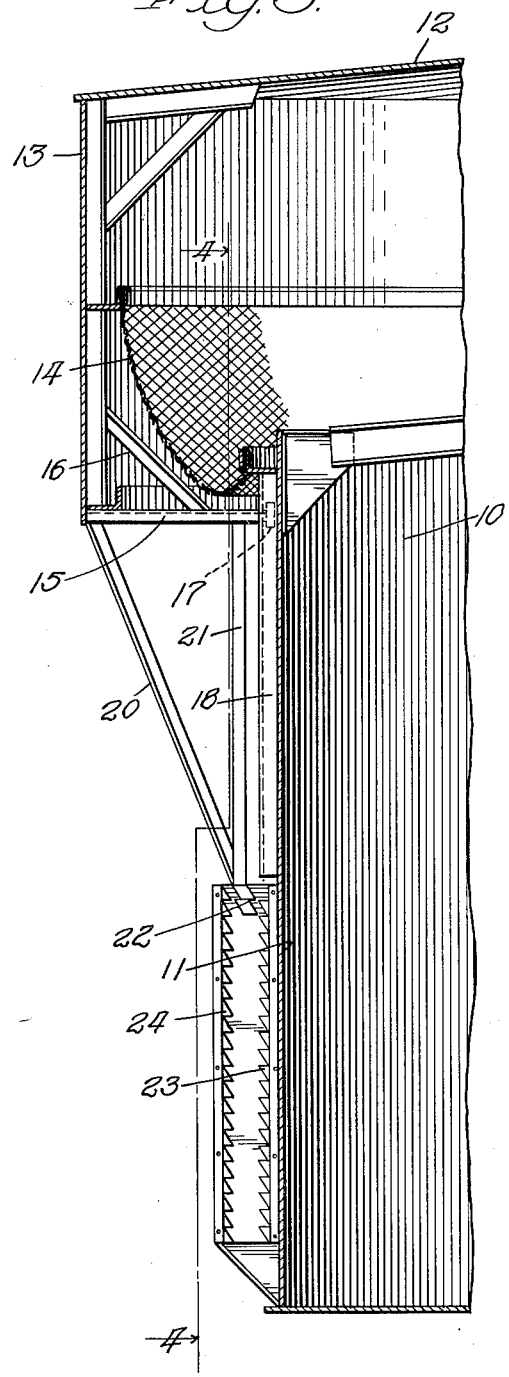
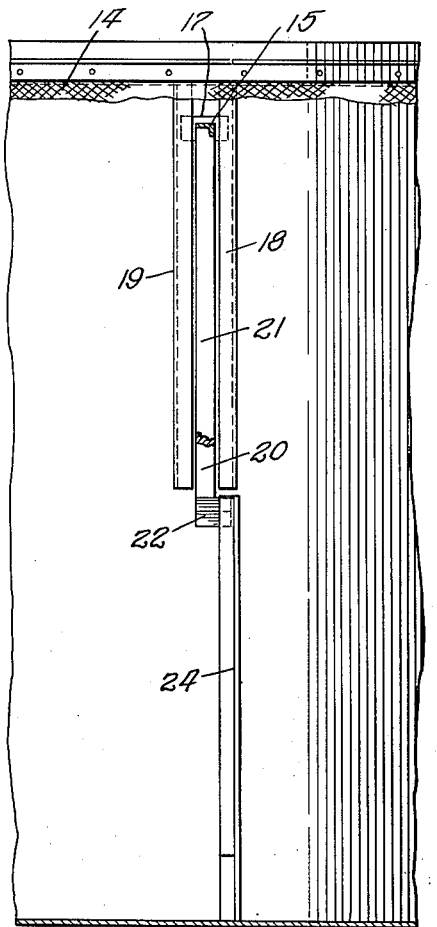
Inventor:
Christian Arne,
By Chritton, Schroeder, Merriam & Hofgren,
Attys.

Patented Aug. 2, 1949

2,477,564

UNITED STATES PATENT OFFICE 2,477,564

STABILIZING APPARATUS FOR LIFTER ROOF TANKS

Christian Arne, Chicago, Ill., assignor to Chicago Bridge and Iron Company, a corporation of Illinois Application July 31, 1946, Serial No. 687,409

3 Claims. (Cl. 48—176)

This invention relates to gas storage tanks and more particularly to stabilizing and guide means for a gas storage tank having a lifter roof.

Gas storage tanks commonly employ a lifter roof adapted to rise and fall with increasing and decreasing gas pressure within the tank. Numerous methods have been employed to maintain the roof in a substantially horizontal position even though unequal loads are placed thereon, but such methods have often, in the past, been unwieldy and cumbersome.

I have invented and am herein disclosing and claiming a stabilizing and guide means for a lifter roof which comprises broadly of a plurality of toothed members attached to the roof and a plurality of toothed members attached to the tank cooperable with the first members when the roof is tilted about a horizontal axis, because of unequal loading or other reason, to restrict further tilting.

Figure 1:
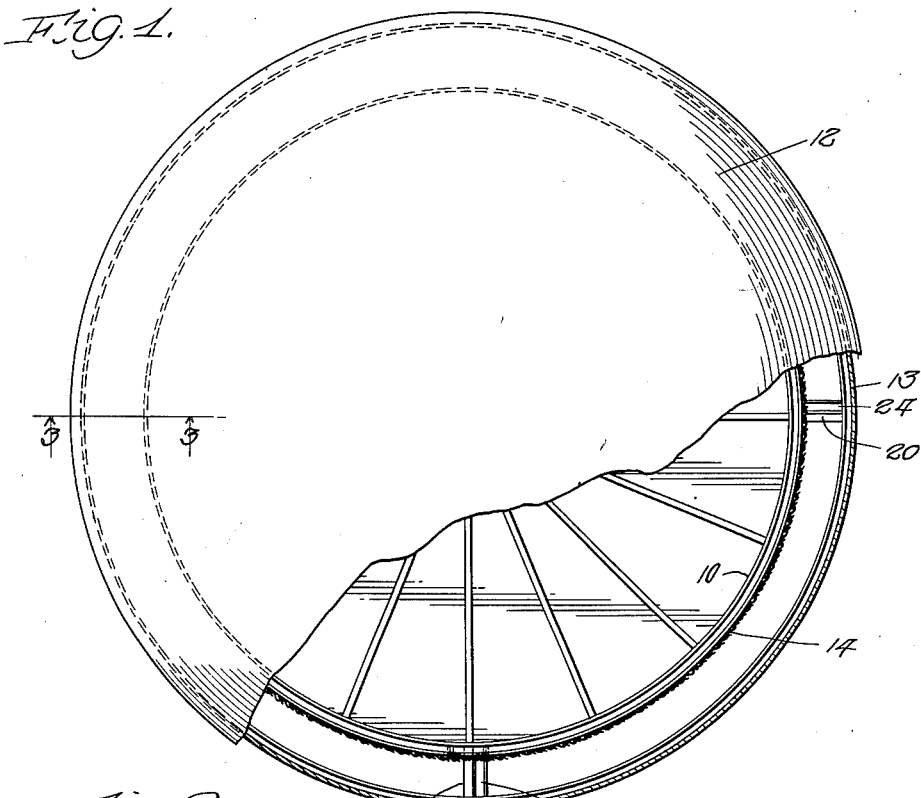
Figure 2:
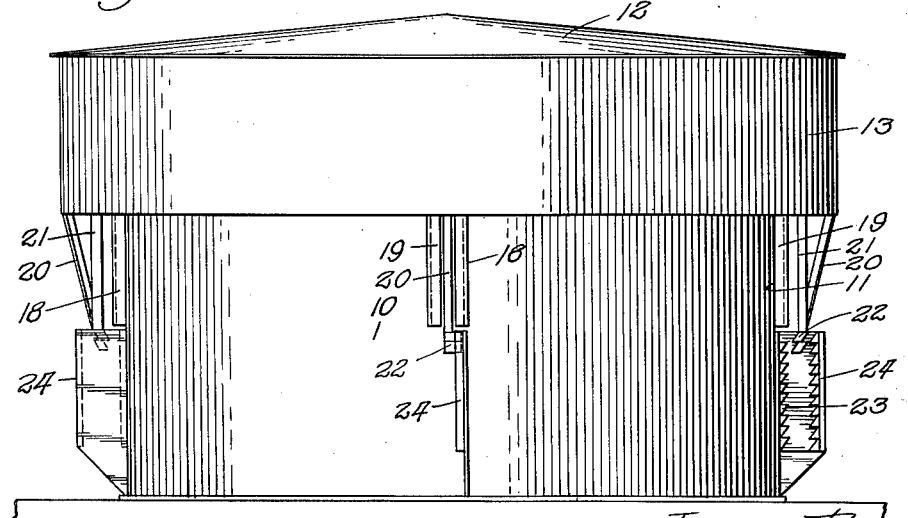

In the accompanying drawings Fig. 1 is a plan view of a tank with the lifter roof thereover partly broken away; Figure 2 is a side elevation showing a tank and a lifter roof; Figure 3 is a sectional view, taken along the lines 3—3 of Fig. 1; and Fig. 4 is a sectional view along the lines 4—4 of Fig. 3.

Referring particularly to Figures 2 and 3, I show a tank 10 having a cylindrical shell 11 and a roof 12 provided with a depending skirt 13. A flexible seal 14 is attached to the interior of the skirt and to the shell to prevent the escape of vapors from the tank. A horizontal member 15 is attached to the lower portion of the skirt and extends inwardly toward the tank. This member may be braced as by brackets 16, as shown. Rotatably mounted on the interior end of the member 15 is a roller 17 adapted to be received in a channel provided by two angular members 18 and 19 vertically aligned on the side of the tank. The two last named members serve to restrict the movement of the roller 17 to vertical movement and thereby prevent rotation of the roof about a vertical axis. Also attached to the member 15 are two depending members 20, 21. These members are joined together at their lower end to form with the member 15 a triangle. Attached to the lower end of the members 20, 21 is a dog 22 provided with inwardly and outwardly facing teeth, and adapted to be spaced from the inner ratchet 23 and the outer ratchet 24 attached to the shell when the roof is in a level position. A plurality of substantially similar dogs and ratchets are provided about the entire periphery of the roof and shell. As shown in the drawings, the ratchet 23 is provided with outwardly facing teeth which are cooperable with the inwardly facing teeth of the dog 22, while the outer ratchet 24 is provided with inwardly facing teeth cooperable with the outwardly facing teeth of the dog.

It can be seen that a load placed upon the portion of the roof shown in Fig. 3 would cause that portion to move downwardly and the roof would tilt about a horizontal axis, pivoting at a point near its center, and the inwardly facing teeth of the dog 22 would engage the outwardly facing teeth of the ratchet 23 after the roof had tilted a small amount, thereby preventing further lowering of that portion. Simultaneously, a dog, diametrically opposed to the dog just mentioned, on the high side of the roof would be moved upwardly by the upward movement of the portion of the roof to which it is attached until the outwardly facing teeth of such dog engaged the inwardly facing teeth of a ratchet provided to cooperated therewith. If, while the roof were in such position and held in such position by the diametrically opposed dogs and ratchets, gas pressure within the shell were to decrease the entire roof would pivot about the first dog until it were substantially level, at which time the dog would free itself of the ratchet and, if the load still remained, drop to and engage the next lower tooth on the inner ratchet and the roof would continue to lower itself by steps, the size of the steps being determined by the size of the teeth on the ratchet.

If, however, while the roof were in the unbalanced condition described and the pressure of gas within the tank were to increase, the roof would pivot about the dog on the high side of the roof and would move upwardly by degrees from tooth to tooth on the outer ratchet on the side of the tank opposite the unequally loaded portion.

The roller 17 being restricted to vertical movement in the channel between the angle irons 18 and 19 prevents rotation of the roof as it rises and falls and also serves to keep the roof centered over the tank.

The foregoing detailed description has been given for the purpose of clearness of understanding only, and no unnecessary limitation or restrictions should be understood therefrom, for some modifications will be obvious to those skilled in the art.

What I claim as new, and desire to secure by Letters Patent, is:

1. In a lifter roof tank comprising a shell and a movable roof thereover, stabilizing and guide means comprising; a plurality of dogs attached to the downwardly extending portion of the roof and having inwardly and outwardly facing teeth; a plurality of vertically aligned ratchets around said tank shell having inwardly facing teeth and outwardly facing teeth spaced from the inwardly facing teeth; said dogs being constructed to be received in said space and to be normally not in contact with said ratchets when the roof is in a level position, and the outwardly facing teeth of said dogs being engageable with said inwardly facing teeth of the ratchets when said roof portion is tilted upwardly about a horizontal axis and the inwardly facing teeth of said dogs being engageable with said outwardly facing teeth of the ratchet when said roof portion is tilted downwardly about said axis to restrict further tilting thereof and vertical guide means to prevent rotation of said roof about a vertical axis.

2. In a lifter roof tank comprising a shell and a movable roof thereover, stabilizing and guide means comprising; a plurality of dogs attached to the downwardly extending portion of the roof and having inwardly and outwardly facing teeth; a plurality of vertically aligned ratchets around said tank shell having inwardly facing teeth and outwardly facing teeth spaced from the inwardly facing teeth, said dogs being constructed to be received in said space and to be normally not in contact with said ratchets when the roof is in a level position, and the outwardly facing teeth of said dogs being engageable with said inwardly facing teeth of the ratchets when said roof portion is tilted upwardly about a horizontal axis and the inwardly facing teeth of said dogs being engageable with said outwardly facing teeth of the ratchet when said roof portion is tilted downwardly about said axis to restrict further tilting thereof.

3. In a lifter roof tank comprising a shell element and a movable roof element thereover, stabilizing and guide means comprising a plurality of dogs attached to one of said elements and having inwardly and outwardly facing teeth, a plurality of vertically aligned ratchets spaced around the other of said elements and attached thereto, said ratchets having inwardly facing teeth and outwardly facing teeth spaced from the inwardly facing teeth, said dogs being constructed to be received in said space between said ratchets and to be normally not in contact with said ratchets when the roof is in a level position, and the teeth of said dogs being engageable with the teeth of said ratchets when said roof is tilted about a horizontal axis to restrict further tilting thereof.

CHRISTIAN ARNE.

No references cited.